United States Patent
Wacker

[11] 3,993,896
[45] Nov. 23, 1976

[54] COMPACT MULTIFLASH UNIT HAVING PROTECTIVE COVER COMPONENT WITH INTEGRAL LIGHT CONTROLLING MEANS

[75] Inventor: Alfred Wacker, Friedberg, Germany

[73] Assignee: Patent-Treuhand-Gesellschaft fur Elektrische Gluhlampen mbH, Munich, Germany

[22] Filed: Mar. 21, 1975

[21] Appl. No.: 560,463

[30] Foreign Application Priority Data
Apr. 4, 1974   Germany.................... 7411807[U]

[52] U.S. Cl. ............................. 240/1.3; 240/106 R
[51] Int. Cl.² ....................................... G03B 15/02
[58] Field of Search ............ 240/1.3, 103 R, 106 R; 354/126, 127; 431/93, 95

[56] References Cited
UNITED STATES PATENTS

| | | |
|---|---|---|
| 3,167,256 | 1/1965 | Elliott .................................. 240/1.3 |
| 3,172,345 | 3/1965 | Jakob et al. ......................... 354/126 |
| 3,488,486 | 1/1970 | Bretthauer ........................... 240/1.3 |
| 3,832,124 | 8/1974 | Loughridge et al. ................... 431/93 |
| 3,860,809 | 1/1975 | Shoupp et al. ....................... 240/1.3 |
| 3,878,385 | 4/1975 | Kingston .............................. 240/1.3 |

FOREIGN PATENTS OR APPLICATIONS

| | | |
|---|---|---|
| 6,678 | 5/1956 | Germany ............................. 240/1.3 |

*Primary Examiner*—Fred L. Braun
*Attorney, Agent, or Firm*—D. S. Buleza

[57] ABSTRACT

A compact multiflash unit that contains a plurality of flashlamps, which are mounted on a base member along with reflector members, is provided with a protective plastic cover having light-controlling prisms molded into its side walls. The prisms are so oriented and profiled that they serve as integral optical elements which direct the light rays from the "fired" lamps toward the scene being photographed, thereby compensating for the lateral spreading of the light rays produced by the shortened reflector members.

7 Claims, 3 Drawing Figures

U.S. Patent    Nov. 23, 1976    3,993,896
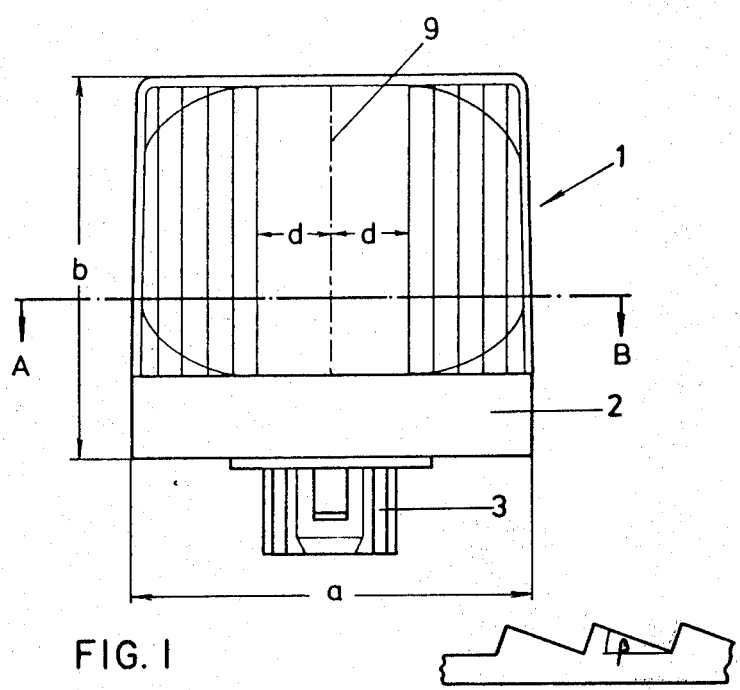
FIG. 1
FIG. 3
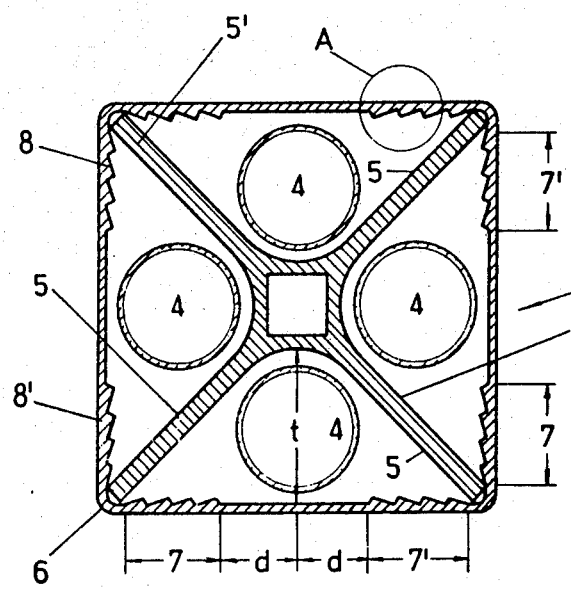
FIG. 2

COMPACT MULTIFLASH UNIT HAVING PROTECTIVE COVER COMPONENT WITH INTEGRAL LIGHT CONTROLLING MEANS

CROSS REFERENCE TO RELATED APPLICATIONS

This application discloses and claims the same invention as that set forth in German Utility Model application No. G 74 11 807.3 filed Apr. 4, 1974.

BACKGROUND OF THE INVENTION

1. Field of the Invention

This invention generally relates to photographic lighting apparatus and has particular reference to an improved multiflash unit having integral means for optically controlling the light produced by the flashlamps.

2. Description of the Prior Art

Multiflash units which contain four flashlamps mounted on a substantially square-shaped plastic base member that has an integrally formed post or jack holder which permits the unit to be inserted into the socket of a camera, or into an adapter, are well known in the art. A so-called "Magicube" unit of this type contains four mechanically ignitable flashlamps that have protruding igniter tubes and are secured to the base member in operative relationship with four cocked springs for percussively igniting the lamps. The unit also includes a reflector component that defines four individual reflectors for the lamps, and has a cover component of cubical configuration and transparent plastic material that is also fastened to the base member and serves as a protective housing.

The width of such prior art Magicube flash units (that is, the basal edge dimension of the unit along one side) is approximately 30 millimeters and their overall height (the thickness of the base member plus the height of the protective cover) is approximately 34 millimeters. Their width-to-height ratio is thus less than 1. The reflector component employed in such prior art units has a height of approximately 30 millimeters and a width (or basal edge dimension) of approximately 25 millimeters. The spacing of the apex of each of the individual reflector elements from the inner face of the associated side wall of the protective cover is approximately 12 millimeters in each case. The outer bulb diameter of the flashlamps is approximately 9 millimeters, the overall length of the flashlamps (bulb length plus the protruding portion of the igniter tube) is approximately 30 millimeters, and the bulb volume is approximately 0.6 cubic centimeter. The lamp filling comprises zirconium shreds and gaseous oxygen.

A more compact or "miniaturized" multiflash unit of the aforesaid type has been proposed and designed that employs smaller lamps, smaller reflector and base components, and specially-designed lamp-ignition means. The width dimension of this smaller more compact multiflash unit is not more than approximately 24 millimeters and its overall height is not more than approximately 22 millimeters. Its width-to-height ratio is thus equal to or slightly greater than 1. The height of the smaller reflector component is only approximately 17 millimeters and the width dimension (basal edge along one side) is not more than approximately 22 millimeters. The apexes of the individual reflector members are spaced from the inner faces of the associated side walls of the protective cubical cover by a distance of only approximately 9 millimeters in each case. The outer bulb diameter of the flashlamps is approximately 7 millimeters, their overall length (bulb length plus the protruding portion of the igniter tube) is approximately 20 millimeters, and the bulb volume is approximately 0.2 cubic centimeter. The lamps are filled with zirconium shreds and gaseous oxygen. However, either hafnium or yttrium may also be used as the combustible material.

In the standard size prior art Magicube type multiflash units, the dimensional correlation between the flashlamps and associated reflector members is such that the desired radiation intensity and spread of the light rays in the direction in which the picture is being taken is achieved without any additional or auxiliary optical means. The protective plastic cover employed in such prior art units thus has side walls with faces (inner and outer) that are flat and smooth. However, due to the shorter more compact design of the reflector component used in the aforementioned miniaturized multiflash unit, the individual reflector members have a proportionately more intense and greater lateral divergence or spread and produce a corresponding greater lateral spreading or divergence of the light rays when the associated lamps are flashed. The amount of light illuminating the scene being photographed is thus decreased which makes it difficult to obtain pictures of the desired quality.

SUMMARY OF THE INVENTION

In accordance with the present invention the undesirable lateral spreading of the light rays produced by the shortened reflector members in such compact multiflash units and the resultant poor illumination of the scene being photographed are corrected by providing the plastic cover component with integral optical means which produce a light-focusing effect. In the preferred embodiment the light-transmitting molded plastic cover which protectively encloses the four percussive flashlamps and their associated igniter springs and reflectors is provided with side walls the inner surfaces or faces whereof are profiled or contoured to define a prismatic light-controlling means. Each of the side faces of the protective plastic cover is provided with two sets of prisms which extend vertically across the face of the cover and are symmetrically disposed on opposite sides of a plane that is perpendicular to the side face and includes the bisectrix of the unit disposed at right angles to the plane which contains the base plate base member. The two sets of prisms are spaced a predetermined distance from the bisectrix and this spacing is correlated with the spacing of the inner face of the side wall of the cover from the apex of the associated reflector. Each set of prisms consists of four individual prisms arranged in side-by-side relationships with their refractive edges extending parallel to the bisectrix which is perpendicular to the plane of the base member.

BRIEF DESCRIPTION OF THE DRAWINGS

A better understanding of the invention will be obtained from the exemplary embodiment shown in the accompanying drawings, wherein:

FIG. 1 is a front-elevational view of a multiflash unit embodying the invention;

FIG. 2 is a cross-sectional view of the multiflash unit along line A-B, in the direction of the arrows; and FIG. 3 is an enlarged cross-sectional view of the individual prisms contained in segment A of FIG. 2.

DESCRIPTION OF THE PREFERRED EMBODIMENT

As shown in FIGS. 1 and 2, the improved multiflash unit 1 of the present invention is provided with a generally square-shaped base member 2 of plastic material that serves as a carrier and is provided with an integrally-formed post or jack holder 3. Four mechanically ignitable flashlamps 4 are mounted on and supported by the base member 2 in the usual manner. Each of the flashlamps 4 include a small igniter tube that contains an anvil which is coated with a percussive primer and the tube is sealed into the lamp bulb in accordance with standard practice. The overall length of the flashlamps 4, including the protruding portion of the igniter tube, is approximately 20 millimeters, the outer diameter of the lamp bulb is approximately 7 millimeters, and the bulb volume is approximately 0.2 cubic centimeter. The lamps 4 are filled with zirconium shreds and gaseous oxygen or, alternatively, hafnium or yttrium is employed as the combustible material.

Each of the flashlamps 4 are coated with the usual layer of colorless plastic material (not shown) preferably a cellulose lacquer, which prevents the glass bulbs from shattering when the lamps are fired. Each of the flashlamps 4 are also paired with a flat spiral spring (not shown) that is mounted on the base member 2 and is adapted to strike the igniter tube, when the spring is released, and thus "fire" the associated flashlamp in the usual manner. A reflector component 5' is also mounted on the base member 2 and defines four individual reflectors 5 that are disposed in operable relationship with the flashlamps 4. The height of the reflector component 5' is 17 millimeters and its width (basal edge length) is 22 millimeters. The aforementioned flashlamps 4, percussion springs and reflector component 5' are all enclosed by a protective cover 6 of cubical configuration that is composed of transparent radiation-transmissive plastic which is tinted to have a blue color.

As shown in FIG. 2, the inner face of each of the side walls of the protective cover 6 is spaced a predetermined distance $t$ from the apex of the associated individual reflector 5. In the case of the previously described miniaturized or compact multiflash unit 1 having a width-to-height ratio that is equal to or slightly greater than 1, spacing $t$ is approximately 9 millimeters in each case. The width dimension $a$ (FIG. 1) of the multiflash unit 1 (that is, the basal edge length along one side) is, accordingly, approximately 24 millimeters and the height dimension $b$ of the unit (that is, the lateral edge length) is approximately 22 millimeters.

In accordance with the present invention, each of the blue-colored side walls of the protective plastic cover 6 is provided with an integrally formed prismatic inner profiling that defines two sets of prisms 7 and 7', as shown most clearly in FIG. 2. Each set of prisms consists of four individual prism elements 8 and 8' that are disposed in side-by-side relationship with their refractive edges extending parallel to the bisectrix 9 (see FIG. 1) which is perpendicular to the plane of the base member 2.

As shown in FIG. 3, the refractive angle $\beta$ of each of the prism elements 8, 8' is 20°.

As will be noted in FIGS. 1 and 2, the two groups or sets of prisms 7, 7' on the inner face of each of the side walls of the protective cover 6 extend symmetrically on both sides of a plane which is perpendicular to the respective side walls and includes the bisectrix 9. The sets of prisms are spaced a predetermined distance $d$ from the aforesaid bisectrix. The central portion of each side wall of the cover 6 is thus devoid of prismatic profiling and is flat and smooth. The spacing $d$ in the case of the specific example of the compact multiflash unit 1 described previously is 4 millimeters. The ratio of this spacing (dimension $d$) to the spacing of the inner face of the cover side walls from the apex of the associated individual reflector 5 (dimension $t$) is thus 1:2.25.

The prismatic inner profiling of the side wall faces of the protective cover 6 just described produces a focusing effect which directs the light emission from the flashlamps 4 in the direction in which the picture is being taken and thus assists the individual reflector members 5 in concentrating the light on the scene being photographed. With a half-power angle or 25°, the marginal decline is only 11.5%.

According to an alternative embodiment of the present invention, the protective cover component 6 is composed of colorless transparent plastic and the individual flashlamps 4 are coated with a blue-colored layer of suitable plastic. The integral prismatic profiling of the plastic cover component pursuant to this invention may also be employed in a "flashcube" type multiflash unit of small compact size which contains electrically-ignitable flashlamps instead of mechanically-ignitable flashlamps. The invention can also be employed in other types of multiflash units which are, for example, of spherical or planar configuration and contain electrically or mechanically-ignitable flashlamps and are of such a small size that prismatic profiling and integral auxiliary light-focusing means might be required.

I claim as my invention:

1. In a compact photographic multiflash unit having a plurality of flashlamps that are mounted on a base member in operative relationship with a reflector component which defines an individual reflector for each of said flashlamps and thus provides a plurality of flashlamp-reflector assemblies that are enclosed by a radiation-transmissive protective cover that is composed of plastic and is attached to said base member, said protective cover being of such configuration that a side wall portion thereof is disposed in front of each of the flashlamp-reflector assemblies with the inner face of the side wall portion disposed adjacent the associated flashlamp, the improvement comprising a plurality of prismatic-shaped elements that constitute integral parts of each of the respective side wall portions of the protective plastic cover and are arranged in spaced sets with the individual prismatic-shaped elements oriented relative to the associated flashlamp-reflector assembly in a manner such that said prismatic-shaped elements constitute an integral light-controlling structure which produces a light-focusing effect that optically directs the light rays from the fired flashlamps in the direction in which the photograph is being taken, the ratio of the width-to-height dimensions of said multiflash unit being at least 1.

2. The improved compact multiflash unit of claim 1 wherein said prismatic-shaped elements comprise prisms that constitute integral parts of the inner faces of the respective side wall portions of the protective cover and each of said side wall portions include two sets of said prisms that are spaced from one another and located on opposite sides of a plane that is perpendicular to and bisects the associated side wall portion of said cover.

3. The improved compact multiflash unit of claim 2 wherein; each set of prisms consists of four individual prisms that are disposed in side-by-side relationship with their refractive edges extending parallel to said perpendicular-bisector plane, and each set of prisms is spaced a predetermined distance from said plane so that the central portion of the associated side wall portion of said protective cover is devoid of prisms.

4. The improved compact multiflash unit of claim 3 wherein; each of said reflectors are of concave configuration and have an apex, and the ratio of the spacing of each set of prisms from said perpendicular-bisector plane to the spacing of the inner face of the associated side wall portion of the protective cover from the apex of the associated reflector is 1:2.25.

5. The improved compact multiflash unit of claim 3 wherein each of the individual prisms have a refractive angle of from 20° to 25°.

6. The improved compact multiflash unit of claim 5 wherein; said protective cover is of cubical configuration, the reflector component has a height of 17 millimeters and a width dimension of 22 millimeters, and the multiflash unit has a width dimension of approximately 24 millimeters and an overall height dimension of approximately 22 millimeters.

7. The improved compact multiflash unit of claim 6 wherein: said flashlamps have an overall length of approximately 20 millimeters, an outer bulb diameter of approximately 7 millimeters and a bulb volume of about 0.2 cubic centimeter.

* * * * *